(12) United States Patent
Ahn et al.

(10) Patent No.: US 11,678,390 B2
(45) Date of Patent: Jun. 13, 2023

(54) ELECTRONIC DEVICE FOR PERFORMING WIRELESS COMMUNICATION AND WIRELESS COMMUNICATION METHOD

(71) Applicant: Samsung Electronics Co., Ltd., Gyeonggi-do (KR)

(72) Inventors: Jeongho Ahn, Gyeonggi-do (KR); Sungnam Kang, Gyeonggi-do (KR); Jungyouel Bang, Gyeonggi-do (KR); Sunyoung Song, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 160 days.

(21) Appl. No.: 17/151,779

(22) Filed: Jan. 19, 2021

(65) Prior Publication Data

US 2021/0227603 A1 Jul. 22, 2021

(30) Foreign Application Priority Data

Jan. 22, 2020 (KR) .................. 10-2020-0008876

(51) Int. Cl.
*H04W 76/14* (2018.01)
*H04W 52/24* (2009.01)
(Continued)

(52) U.S. Cl.
CPC ............ *H04W 76/14* (2018.02); *H04W 4/80* (2018.02); *H04W 8/005* (2013.01); *H04W 52/243* (2013.01)

(58) Field of Classification Search
CPC ..... H04W 76/14; H04W 4/80; H04W 52/243; H04W 8/005
See application file for complete search history.

(56) References Cited

U.S. PATENT DOCUMENTS 7,389,088 B2   6/2008   Kim
8,340,578 B2   12/2012  Tolentino et al.
(Continued)

FOREIGN PATENT DOCUMENTS

KR   10-2004-0103658 A   12/2004
KR   10-2016-0039440 A   4/2016
KR   10-2019-0040050 A   4/2019

OTHER PUBLICATIONS

International Search Report dated Apr. 27, 2021.

*Primary Examiner* — Elton Williams
(74) *Attorney, Agent, or Firm* — Cha & Reiter, LLC

(57) ABSTRACT

In accordance with certain embodiments of the disclosure, an electronic device comprises a communication circuitry configured to transmit or receive a first wireless communication signal to an external device in a first communication scheme; a memory; and a processor, wherein the processor is configured to: scan for a second wireless communication signal by a second communication scheme proximate to the electronic device; operate in a first mode of controlling a transmission power of the first wireless communication signal based on receive sensitivity for the first wireless communication signal of the external device, when the second wireless communication signal is determined to interfere less than an interference level with the first communication scheme; and operate in a second mode of transmitting the first wireless communication signal at a higher transmission power than the first mode, when the second wireless communication signal is determined to interfere in excess of the interference level with the first communication scheme.

17 Claims, 7 Drawing Sheets

(51) Int. Cl.
*H04W 8/00* (2009.01)
*H04W 4/80* (2018.01)

(56) References Cited

U.S. PATENT DOCUMENTS

| | | |
|---|---|---|
| 8,599,709 B2 | 12/2013 | Chen et al. |
| 8,693,950 B2 | 4/2014 | Desai |
| 9,113,349 B2 | 8/2015 | Tolentino et al. |
| 9,319,887 B2 | 4/2016 | Chen et al. |
| 9,549,411 B2 | 1/2017 | Miao |
| 9,602,999 B2 | 3/2017 | Kim et al. |
| 9,781,675 B2 | 10/2017 | Mofidi et al. |
| 9,839,041 B2 | 12/2017 | Tolentino et al. |
| 9,955,379 B2 | 4/2018 | Chen et al. |
| 9,961,487 B1 | 5/2018 | Miao |
| 10,123,345 B2 | 11/2018 | Narasimha et al. |
| 10,200,847 B2 | 2/2019 | Kim et al. |
| 10,616,795 B2 | 4/2020 | Chen et al. |
| 10,659,949 B2 | 5/2020 | Kim et al. |
| 10,757,654 B2 | 8/2020 | Wang et al. |
| 2004/0244258 A1 | 12/2004 | O'Dwyer et al. |
| 2007/0224936 A1* | 9/2007 | Desai ............... H04W 52/243 455/41.2 |
| 2011/0153818 A1* | 6/2011 | Vandwalle ............ H04L 69/28 709/224 |
| 2012/0164948 A1 | 6/2012 | Narasimha et al. |
| 2013/0183904 A1* | 7/2013 | Hiben ................ H04W 36/20 455/63.1 |
| 2016/0050681 A1 | 2/2016 | Tolentino et al. |
| 2016/0353450 A1 | 12/2016 | Miao |
| 2017/0164289 A1 | 6/2017 | Mofidi et al. |
| 2018/0317127 A1 | 11/2018 | Chen et al. |

\* cited by examiner

ELECTRONIC DEVICE FOR PERFORMING WIRELESS COMMUNICATION AND WIRELESS COMMUNICATION METHOD

CROSS-REFERENCE TO RELATED APPLICATION(S)

This application is based on and claims priority under 35 U.S.C. § 119 to Korean Patent Application No. 10-2020-0008876, filed on Jan. 22, 2020, in the Korean Intellectual Property Office, the disclosure of which is incorporated by reference herein its entirety.

BACKGROUND

1. Field

The disclosure relates to an electronic device for transmitting and receiving a sound signal with an external device through wireless communication.

2. Description of Related Art

An electronic device, such as a smartphone, a tablet personal computer (PC), or a wearable device (e.g., a smart watch or a smart glass), may perform various functions using wireless communication. For example, the electronic device may perform a voice call, a video call, or a web search function, using wireless communication. For another example, the electronic device may be paired with an accessory device (e.g., a Bluetooth earphone) proximate to the electronic device using wireless communication to output audio according to music playback or video playback.

The electronic device may be paired with an external device (or an accessory device) through various short-range communication schemes. For example, the electronic device may be paired with an acoustic output device (e.g., earbuds, an earset, a headset, or the like) through Bluetooth communication to transmit and receive a sound signal.

The above information is presented as background information only to assist with an understanding of the disclosure. No determination has been made, and no assertion is made, as to whether any of the above might be applicable as prior art with regard to the disclosure.

SUMMARY

In accordance with certain embodiments of the disclosure, an electronic device comprises a communication circuitry configured to transmit or receive a first wireless communication signal to an external device in a first communication scheme; a memory; and a processor, wherein the processor is configured to: scan for a second wireless communication signal by a second communication scheme proximate to the electronic device; operate in a first mode of controlling a transmission power of the first wireless communication signal based on receive sensitivity for the first wireless communication signal of the external device, when the second wireless communication signal is determined to interfere less than an interference level with the first communication scheme; and operate in a second mode of transmitting the first wireless communication signal at a higher transmission power than the first mode, when the second wireless communication signal is determined to interfere in excess of the interference level with the first communication scheme.

In accordance with certain aspects of the disclosure, a wireless communication method performed in an electronic device comprises: pairing with an external device to transmit and receive data in a first communication scheme; scanning for a signal by a second communication scheme proximate to the electronic device; performing control in a first mode of changing a transmission power of a first wireless communication signal based on receive sensitivity for the first wireless communication signal of the external device, when a second wireless communication signal is determined to interfere by less than the interference level with the first communication scheme; and performing control in a second mode of transmitting the first wireless communication signal at a higher transmission power than the first mode, when the second wireless communication signal is determined to interfere in excess of the interference level with the first communication scheme.

Other aspects, advantages, and salient features of the disclosure will become apparent to those skilled in the art from the following detailed description, which, taken in conjunction with the annexed drawings, discloses certain embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

With regard to description of drawings, the same or similar denotations may be used for the same or similar components.

DETAILED DESCRIPTION

When transmitting a sound to an acoustic output device (e.g., earbuds) in a Bluetooth enhanced data rate (EDR) mode, an electronic device may change transmission power in response to a power increase request or a power decrease request provided from the acoustic output device (e.g., the earbuds). Where in an area a lot of WiFi interference, such as increased in-band noise of Bluetooth EDR, the audio transmission can be interrupted frequently.

Recently, the number of Bluetooth communication devices have been increased as the Internet of things (IoT) technology has developed, the number of free WiFi access points (APs) has expanded in public places. Accordingly, and an interference signal of a Bluetooth communication band has been increased due to a 2.4G frequency band characteristic (ISM band) publicly available. For example, Bluetooth communication quality is sharply degraded due to an interference signal of the 2.4 GHz frequency band in a place, for example, a busy subway station, a busy train station, a working area with a large transient population, or a department store with a large transient population.

Aspects of the disclosure are to address at least the above-mentioned problems and/or disadvantages and to provide at least the advantages described below. Accordingly, an aspect of the disclosure is to provide an electronic device for detect an interference signal around the electronic device and changing a mode of a wireless communication power of short-range communication based on the interference signal.

Hereinafter, certain embodiments of the disclosure may be described with reference to accompanying drawings. However, it should be understood that this is not intended to limit the embodiments described in the disclosure to specific disclosed forms and includes various modifications, equivalents, and/or alternatives of embodiments of the disclosure. With regard to description of drawings, similar denotations may be used for similar components.

Figure 1:
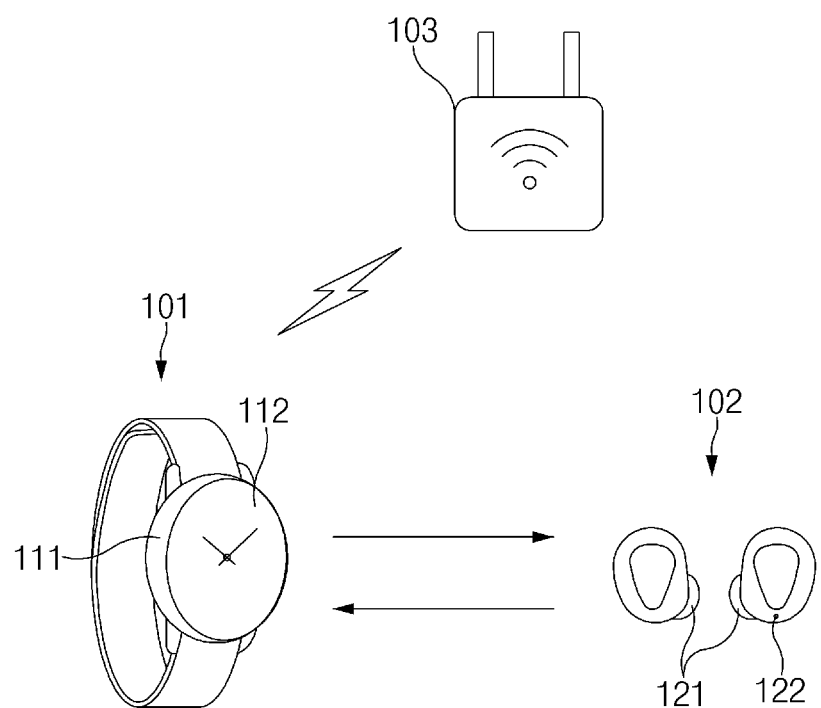
FIG. 1 is a drawing illustrating a first electronic device and a second electronic device according to certain embodiments.

FIG. 1 is a drawing illustrating a first electronic device and a second electronic device according to certain embodiments. FIG. 1 shows that a first electronic device 101 can be engaged in Bluetooth communications with a second electronic device 102, and WiFi communications with a third electronic device 103. WiFi communication signals can potentially interfere Bluetooth communication signals. Accordingly, first electronic device 101 may identify whether the WiFi communication signals will cause interference with the Bluetooth communication signals (an interference condition). Depending on whether there is an interference condition, the electronic device 101 can adjust the power of the transmission of Bluetooth communication signals.

Referring to FIG. 1, a first electronic device (or a terminal device) 101 may include a housing 111 and a display 112. The housing 111 may include various components, such as a processor, a memory, a communication module, a printed circuit board (PCB), or a battery, which are necessary for an operation of the first electronic device 101. The display 112 may display content such as a text or an image. Although FIG. 1 shows that the first electronic device 101 is a smart watch, the first electronic device 101 is not limited thereto. For example, the first electronic device 101 may be a smartphone or a table personal computer (PC).

The first electronic device 101 may transmit and receive data with a second electronic device 102. The transmission and reception of the data can be in accordance with a first communication scheme. For example, the first device 101 may transmit and receive data with the second electronic device 102 through Bluetooth communication. The Bluetooth communication may use an industrial scientific medical (ISM) band of the 2.4 GHz band. The ISM band may be freely used without a separate license, and the Bluetooth communication scheme may have a guide band between the 2 MHz band under the ISM band and the 3.5 MHz band over the ISM band. The guide band is to prevent interference with another device.

The first electronic device 101 may support a Bluetooth enhanced data rate (EDR). The Bluetooth EDR may be a short-range communication standard supporting short-range wireless connectivity, which may support better audio performance and low power consumption. Hereinafter, Bluetooth communication shall be used as the first communication scheme with the understanding that this disclosure is not limited to Bluetooth communication and other communication schemes can be used as the first communication scheme.

The second electronic device 102 may transmit and receive an audio signal (or an audio source signal) to and from the first electronic device 101. The transmission and reception may be using Bluetooth communication. The second electronic device 102 may include a receiver (or a sound output device or a speaker) 121 for converting an audio to sound and a microphone 122 for converting sound to an audio signal. Although the second electronic device 102 is shown as earbuds, the second electronic device 102 is not limited to the same, and may be a headset, an earphone, an electronic pen, or a separate wearable device.

According to certain embodiments, the first device 101 may perform pairing for Bluetooth communication) with the second electronic device 102. For example, the first electronic device 101 may broadcast an inquiry signal and may receive a device address from the second electronic device 102 in response to the inquiry signal. The first electronic device 101 may request that the second electronic device 102, to transmit a device name. The second electronic device 102 may transmit the device name to the first electronic device 101, in response to the request. The first electronic device 101 may receive the device name from the second electronic device 102 and may be paired with the second electronic device 102 automatically or through a user input.

After being paired, the first device 101 may transmit an audio signal (or an audio source signal) to the second electronic device 102 using Bluetooth communication.

The first electronic device 101 engage in wireless communication using a second communication scheme (e.g., WiFi communication) with a nearby wireless communication device, such as a WiFi communication AP) 103. Hereinafter, the example with WiFi communication shall be used as the second communication scheme with the understanding that this disclosure is not limited to WiFi communication and other communication schemes can be used as the second communication scheme. The first electronic device 101 or the wireless communication device 103 may transmit a request signal or a device search signal for starting WiFi communication.

Signals according to WiFi communication may interfere with the transmission and reception of Bluetooth communication signals.

The first electronic device 101 may detect whether there is sufficient interference with Bluetooth communication signals by the WiFi communication signals (hereinafter referred to as an interference condition). The first electronic device 101 may detect a communication band (in-band) (e.g., 2.4 GHz to 2.5 GHz) allocated to Bluetooth communication is in an environment having many interference signals, through network analysis. For example, the first electronic device 101 may scan a nearby WiFi signal periodically or before/after being paired, and may monitor the number of nearby WiFi APs or an AP share for each channel.

The first electronic device 101 may change a power transfer scheme (or mode) of Bluetooth communication depending on the interference condition. In the absence of an interference condition of an external signal (hereinafter referred to as a general state), the first electronic device 101 may operate in a first mode of adjusting a transmission power of Bluetooth communication based on receive sensitivity of the second electronic device 102. In the interference condition (hereinafter referred to as an interference state), the first electronic device 101 may operate in a second mode of maintaining a stronger wireless transmission power than the first mode.

Figure 2:
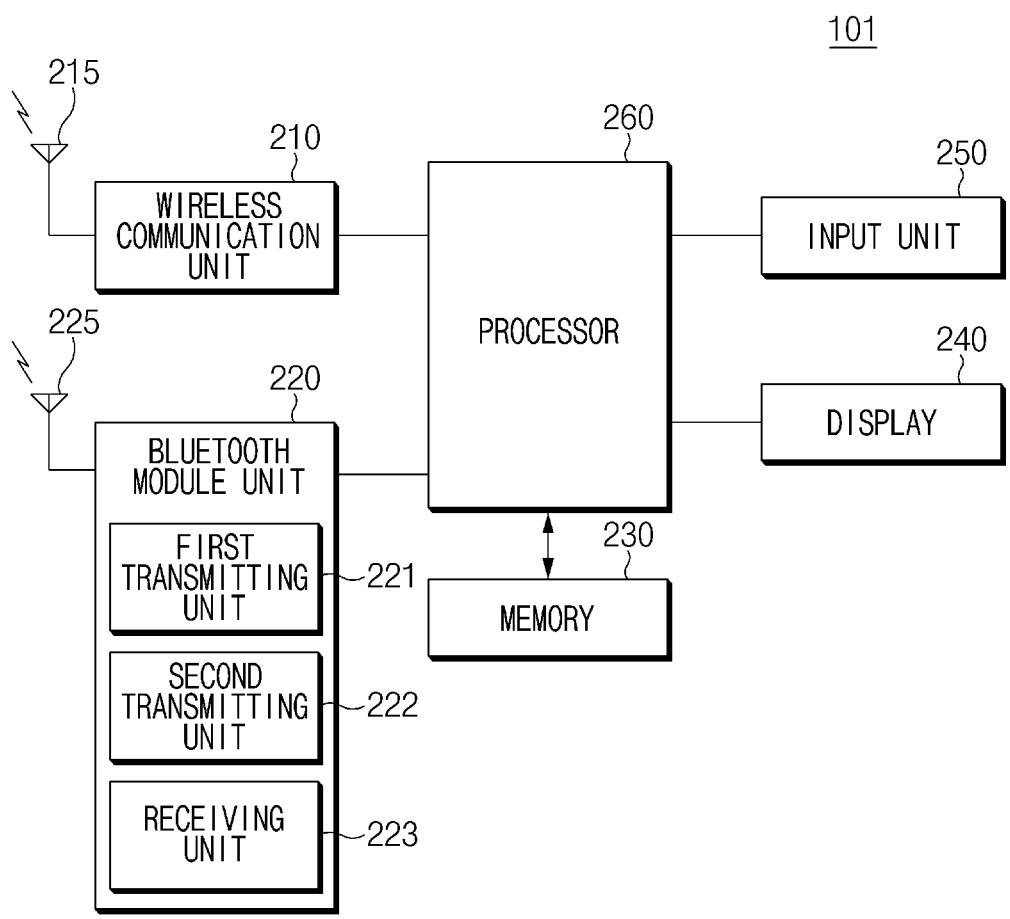
FIG. 2 is a block diagram illustrating a first electronic device according to certain embodiments.

FIG. 2 is a block diagram illustrating a first electronic device according to certain embodiments.

Referring to FIG. 2, a first electronic device 101 may include a wireless communication unit 210, a first antenna 215, a Bluetooth module unit 220, a second antenna 225, a memory 230, a display 240, an input unit 250, and a processor 260. FIG. 2 illustrates some components included in a first electronic device 101, but not limited thereto.

The wireless communication unit 210 may transmit and receive wireless data via the first antenna 215. For example, the wireless communication unit 210 may include a radio frequency (RF) transmitter for up-converting and amplifying a frequency of a transmitted signal and an RF receiver for performing low-noise processing of a received signal to amplify the signal and down-converting a frequency of the amplified signal. For example, the wireless communication unit 210 may perform long-range communication such as 5the generation (5G) or long term evolution (LTE).

The wireless communication unit 210 may receive data over a wireless channel to provide the received data to the processor 260, and may transmit data, provided from the processor 260, to an external device (e.g., a base station or a server) over the wireless channel.

The Bluetooth module unit 220 may wirelessly transmit and receive a sound signal and a data signal with a device (e.g., a second electronic device 102 of FIG. 1) capable of performing Bluetooth communication, via the second antenna 225. The Bluetooth module unit 220 may deliver a signal, received from the second electronic device 102, to the processor 260. The Bluetooth module unit 220 may transmit an audio signal, provided from the processor 260, to the second electronic device 102.

The Bluetooth module unit 220 may deliver device identification information (e.g., a Bluetooth device address (BD_ADDR)), a user friendly name, device class information, or the like) of each of peripheral devices. When the first electronic device 101 is paired with the second electronic device 102, the Bluetooth module unit 220 may perform wireless communication with a communication circuitry of the second electronic device 102.

The Bluetooth module unit 220 may include a first transmitting unit 221, a second transmitting unit 222, and a receiving unit 223.

The first transmitting unit (or a first transmit circuit) 221 may be used in a first mode of adjusting a transmission power of Bluetooth communication based on the receive sensitivity of the second electronic device 102. A power level of a signal transmitted from the first transmitting unit 221 may be lower than a power level of a signal transmitted from the second transmitting unit 222.

The second transmitting unit (or a second transmit circuit) 222 may be used in a second mode of maintaining a stronger transmission power than the first mode. A power level of a signal transmitted from the second transmitting unit 222 may be higher than a power level of a signal transmitted from the first transmitting unit 221.

It is illustratively shown that the first transmitting unit 221 and the second transmitting unit 222 are implemented as different power transfer circuits, but not limited thereto. For example, the first transmitting unit 221 and the second transmitting unit 222 may be implemented as one power transfer circuit.

According to certain embodiments, the Bluetooth module unit 220 may select one of the first transmitting unit 221 or the second transmitting unit 222 depending on a control signal received from the processor 260 to transmit a Bluetooth signal. Furthermore, the Bluetooth module unit 220 may switch a transmitting unit or may fail to switch the transmitting unit, which transmits a Bluetooth signal, depending on a control signal received from the processor 260 to change a power level.

The receiving unit (or a receive circuit) 223 may receive a Bluetooth signal from the second electronic device 102. The Bluetooth module unit 220 may deliver the received signal to the processor 260.

The memory 230 may play a role in storing a program and data necessary for an operation of the first electronic device 101 and may be divided into a program area and a data area. The memory 230 may store device information about the second electronic device 102 which performs pairing. For example, when the first electronic device 101 performs pairing with the second electronic device 102, the memory 230 may store a device address, a device name, and a link key of the second electronic device 102. The link key may be a key used for authentication and encryption to be securely paired with Bluetooth devices. For example, the link key may be generated by a Bluetooth device address, a private user key, and an irregular number (e.g., a random function value) generated newly whenever a new connection between Bluetooth devices is established.

The display 240 may be configured as a liquid crystal display (LCD) and may visually provide a user with a variety of information. For example, the display 240 may output a booting screen, an idle screen, a display screen, a call screen, or other application execution screens.

The processor 260 may control the Bluetooth module unit 220 to broadcast an inquiry signal. When Bluetooth devices located around the first electronic device 101 are found, the display 240 may display a list of the found Bluetooth devices under control of the processor 260. The display 240 may display a device address of each of the Bluetooth devices.

The input unit 250 may receive an input signal of the user for controlling the first electronic device 101 and may deliver the received input signal to the processor 260. The input unit 250 may receive an input selecting one of the Bluetooth devices located around the first electronic device 101.

The processor 260 may perform a variety of calculation necessary for an operation of the electronic device 101. The processor 260 may perform signal flow among various components in the electronic device 101.

According to certain embodiments, the processor 260 may detect a nearby interference signal interfering in Bluetooth communication. The processor 260 may identify whether the nearby interference signal is in an interference condition interfering in Bluetooth communication. For example, the processor 260 may scan for WiFi signals periodically or before/after being paired, and may monitor the number of nearby WiFi APs, an AP share for each channel, or intensity (e.g., a received signal strength indicator (RSSI)) of the WiFi signals.

According to certain embodiments, the processor 260 may determine a transmitting unit, which transmits a Bluetooth signal, depending on the interference condition. For example, when intensity of a WiFi signal in a communication band (in-band) (e.g., 2.4 GHz to 2.5 GHz) allocated to Bluetooth communication is greater than or equal to a specified value, the processor 260 may transmit a control signal to transmit audio signals using the second transmitting unit 222 to the Bluetooth module unit 220.

According to an embodiment, the first electronic device 101 may include a separate WiFi module (not shown). The WiFi module may transmit and receive a WiFi signal. For example, the WiFi module may include a WiFi antenna and a WiFi signal processing circuit. The processor 260 may determine intensity of a WiFi signal using the signal processed by the WiFi module.

Figure 3:
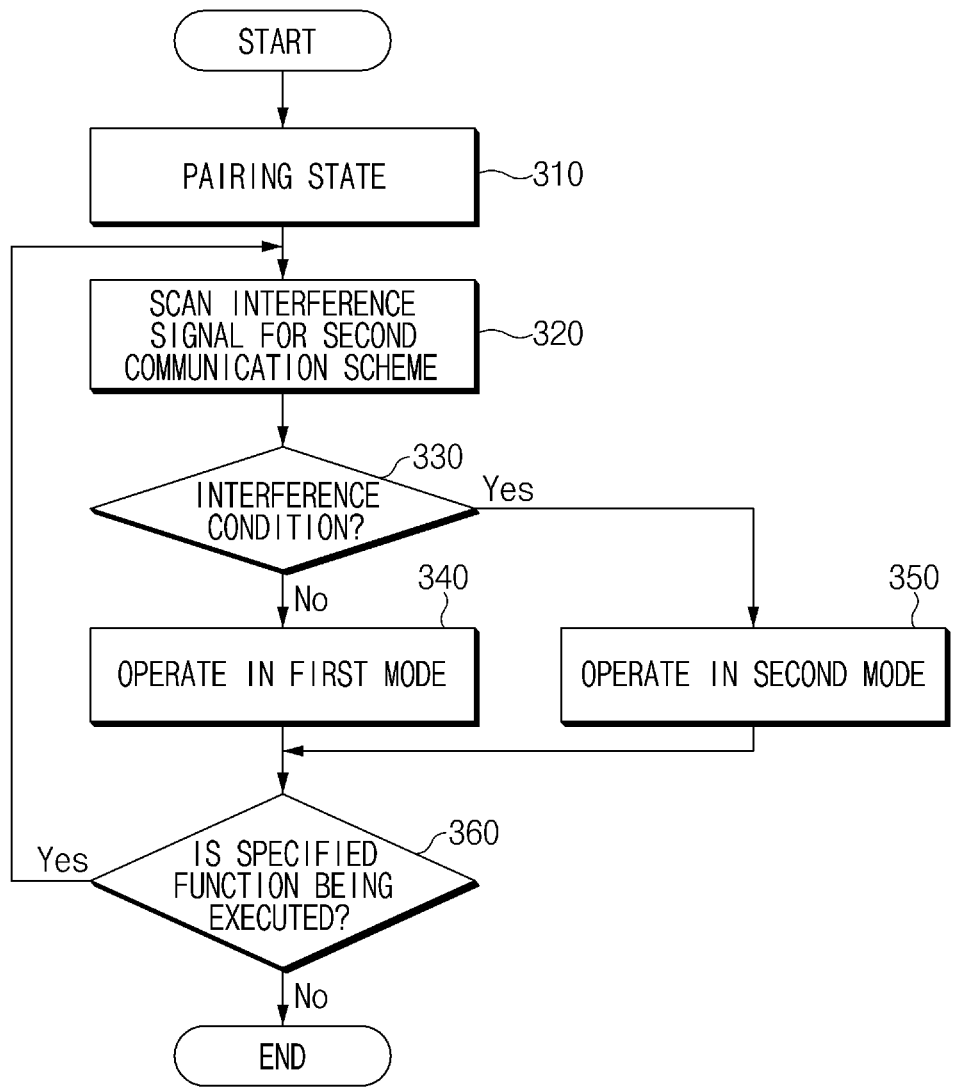
FIG. 3 is a flowchart illustrating a wireless communication method according to certain embodiments.

FIG. 3 is a flowchart illustrating a wireless communication method according to certain embodiments.

Referring to FIG. 3, in operation 310, a first electronic device 101 of FIG. 1 may be paired with a second electronic device 102 of FIG. 1 by a first communication scheme. For example, the first communication scheme may be a Bluetooth communication. The first electronic device 101 may enter a state capable of transmitting and receiving a sound signal with the second electronic device 102, using a communication band (e.g., 2.4 G to 2.48 G) specified for the Bluetooth EDR through the pairing process.

In operation 320, a processor 260 of the first electronic device 101 may scan a second communication scheme that may interfere with the first communication scheme. The interference may be due to a signal of the second or another communication scheme which uses the same frequency band (e.g., 2.4G in-band) as the first communication scheme (e.g., Bluetooth communication). According to an embodiment, the interference signal may include at least one of in-band noise (e.g., a 2.4G band WLAN or PAN signal), out-band harmonic noise (e.g., an 800M or 1.2G band network signal), and other noise (e.g., power noise or the like) irrespective of a frequency.

For example, the processor 260 may scan a WiFi signal capable of interfering in a communication band (in-band) (e.g., 2.4 GHz to 2.5 GHz) allocated to Bluetooth communication. The processor 260 may identify the number of nearby WiFi APs, an AP share for each channel, or intensity (e.g., an RSSI) of an interference signal.

According to certain embodiments, the processor 260 may periodically scan other communication schemes for signals that are likely to interfere with communication signals for the first communication scheme. For example, the processor 260 may periodically scan a nearby interference signal irrespective of the pairing operation of operation 310. For another example, when the pairing of operation 310 starts, the processor 260 may periodically scan a nearby interference signal. For another example, the processor 260 may scan a nearby interference signal at a first period (e.g., 1 minute) before the pairing of operation 310 starts and may scan a nearby interference signal at a second period (e.g., 10 minutes) after the pairing starts.

According to an embodiment, the processor 260 may differently set a scan period of signals from another communication scheme that are likely to interfere depending on an area where the first electronic device 101 is located. For example, the processor 260 may scan signals from another communication scheme that are likely to interfere at a first period (e.g., 1 minute) in a first place, such as a subway station or a department store, where there is likely to be be more interference, and may scan at a second period (e.g., 10 minutes) in a second place such as home, where there is less likely to be more interference.

According to an embodiment, the processor 260 may differently set a scan period depending on a time zone. For example, the processor 260 may scan at the first period (e.g., 1 minute) during a commuting time (7 a.m. to 9 a.m. or 6 p.m. to 9 p.m.) and may scan at a second period (e.g., 10 minutes) during another time.

According to an embodiment, the processor 260 may differently set a scan period depending on a type of running application. For example, the processor 260 may scan at the first period (e.g., 1 minute) when a music play application or a call application is running and may scan at the second period (e.g., 10 minutes) when the music play application or the call is not running.

In operation 330, the processor 260 may identify from scanning signals of other communication schemes whether there is an interference condition. The interference condition may be automatically set or may be stored by user settings. For example, the interference condition may be a condition where intensity (e.g., an RSSI) of a signal in another communication scheme with respect to a communication band (in-band) (e.g., 2.4 GHz to 2.5 GHz) allocated to Bluetooth communication is greater than or equal to a specified value.

When in a general state where there is less than specified amount of interference, in operation 340, the processor 260 may operate in a first mode. The first mode may be a mode of adjusting a transmission power of Bluetooth communication based on receive sensitivity of the second electronic device 102. The processor 260 may transmit a Bluetooth signal using a transmitting unit (e.g., a first transmitting unit 221 of FIG. 2) corresponding to the first mode.

For example, in the first mode, the processor 260 may receive receive sensitivity (e.g., an RSSI) from the second electronic device 102. The processor 260 may maintain a power level of Bluetooth communication when the receive sensitivity (e.g., the RSSI) of the second electronic device 102 is within a predetermined range (e.g., a golden range) and may increase or decrease the power level when the receive sensitivity (e.g., the RSSI) of the second electronic device 102 is out of the range (see FIG. 4).

When in an interference state where the interference signal corresponds to the interference condition, in operation 350, the processor 260 may operate in a second mode. The second mode may be a mode of maintaining a stronger transmission power than the first mode. The processor 260 may transmit a Bluetooth signal using a transmitting unit (e.g., a second transmitting unit 222 of FIG. 2) corresponding to the second mode.

According to certain embodiments, in operation 360, the processor 260 may identify whether a specified function associated with transmitting an audio signal is continuously executed. For example, the processor 260 may identify whether a music play function continues. When the specified function associated with transmitting the sound signal continues being executed, the processor 260 may repeatedly perform operations 320 to 350.

Figure 4:
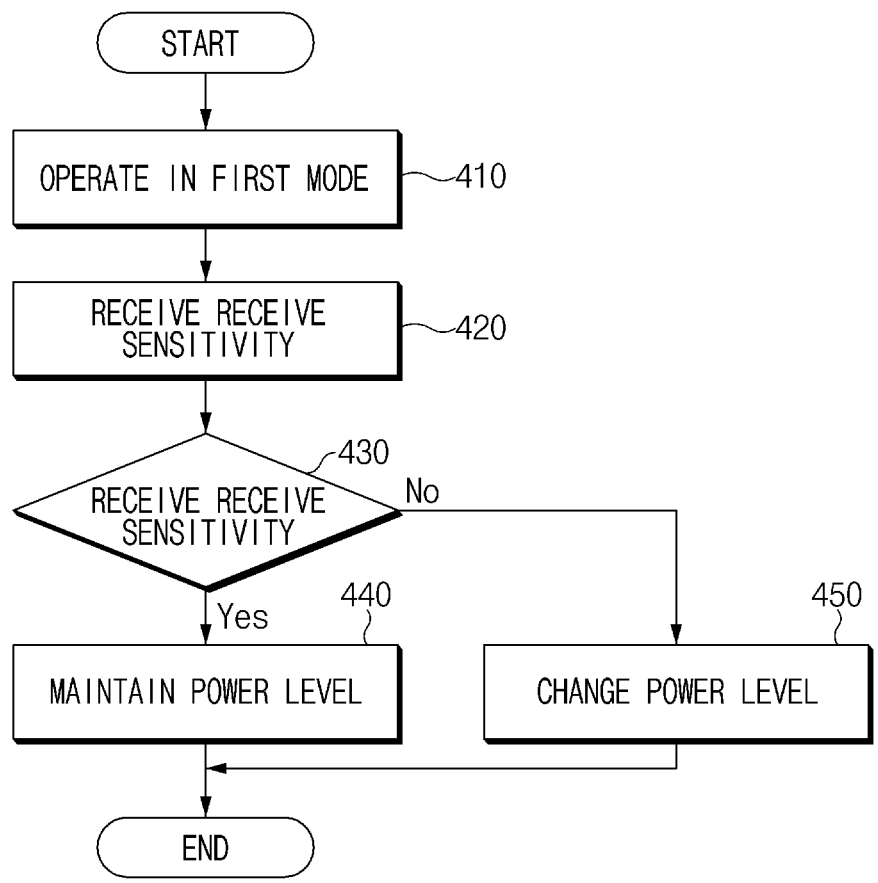
FIG. 4 is a flowchart illustrating a wireless communication method in a first mode according to certain embodiments.

FIG. 4 is a flowchart illustrating a wireless communication method in a first mode according to certain embodiments.

Referring to FIG. 4, when an interference condition of an external signal is a general state, in operation 410, a processor 260 of a first electronic device 101 of FIG. 2 may operate in a first mode. The first mode may be a mode of adjusting a transmission power of Bluetooth communication based on receive sensitivity of a second electronic device 102 of FIG. 1. In the first mode, the processor 260 may transmit a Bluetooth signal using a first transmitting unit 221 of FIG. 2.

The processor 260 of the first electronic device 101 may operate on the basis of a plurality of power levels, in the first mode. For example, the processor 260 may set first to fourth power levels at which a transmission power is increased on a sequential basis.

In operation 420, the processor 260 may receive receive sensitivity (e.g., an RSSI) of the second electronic device 102 for an audio signal transmitted from the first electronic device 101.

In operation 430, the processor 260 may identify whether the receive sensitivity is within a predetermined golden range. The golden range may indicate a receive sensitivity range capable of receiving an audio signal without damage of sound quality. The golden range may be preset (or automatically set) or may be set by a user input. For example, the golden range may be determined as a range of −85 dBm to −70 dBm.

When the receive sensitivity is within the golden range, in operation 440, the processor 260 may maintain a power level of Bluetooth communication.

When the receive sensitivity is out of the golden range, in operation 450, the processor 260 may change (increase or decrease) a power level of Bluetooth communication using the first transmitting unit 221.

According to an embodiment, when the receive sensitivity is less than (or less than or equal to) a lower limit value of the golden range, the processor 260 may increase a power level of Bluetooth communication using the first transmitting unit 221.

For another example, when the receive sensitivity is greater than (or greater than or equal to) an upper limit value of the golden range, the processor 260 may decrease a power level of Bluetooth communication using the first transmitting unit 221.

According to certain embodiments, the processor 260 may change a power level corresponding to the golden range depending on intensity of the scanned interference signal. For example, in the first mode, when first to fourth power levels at which a transmission power is increased on a sequential basis, a second power level may be set to the golden range according to a default setting. When intensity of a nearby interference signal is not a level necessary to change to a second mode and is higher than a specified value, the processor 260 may set a third power level to the golden range.

Hereinafter, scanning the interference signal, or scanned interference signal, shall be understood to refer to scanning other communication schemes for signals that are likely to interfere with the first communication scheme, such as signal that are within a particular frequency band of the other communication schemes.

According to certain embodiments, the processor 260 may change a range of the golden range depending on intensity of the scanned interference signal. For example, in a state where the golden range is set to the range of −85 dBm to −70 dBm, when the intensity of the nearby interference signal is not the level necessary to change to the second mode and is higher than the specified value, the processor 260 may set a range of −75 dBm to −60 dBm to the golden range.

According to certain embodiments, in the first mode, the processor 260 may change a transmission power of an audio signal, in response to a power change request signal received from the second electronic device 102. For example, when receiving a power increase request from the second electronic device 102, the processor 260 may increase a power level of Bluetooth communication on a stage-by-stage basis using the first transmitting unit 221. When receiving a power decrease request from the second electronic device 102, the processor 260 may decrease a power level of Bluetooth communication on a stage-by-stage basis using the first transmitting unit 221.

Figure 5:
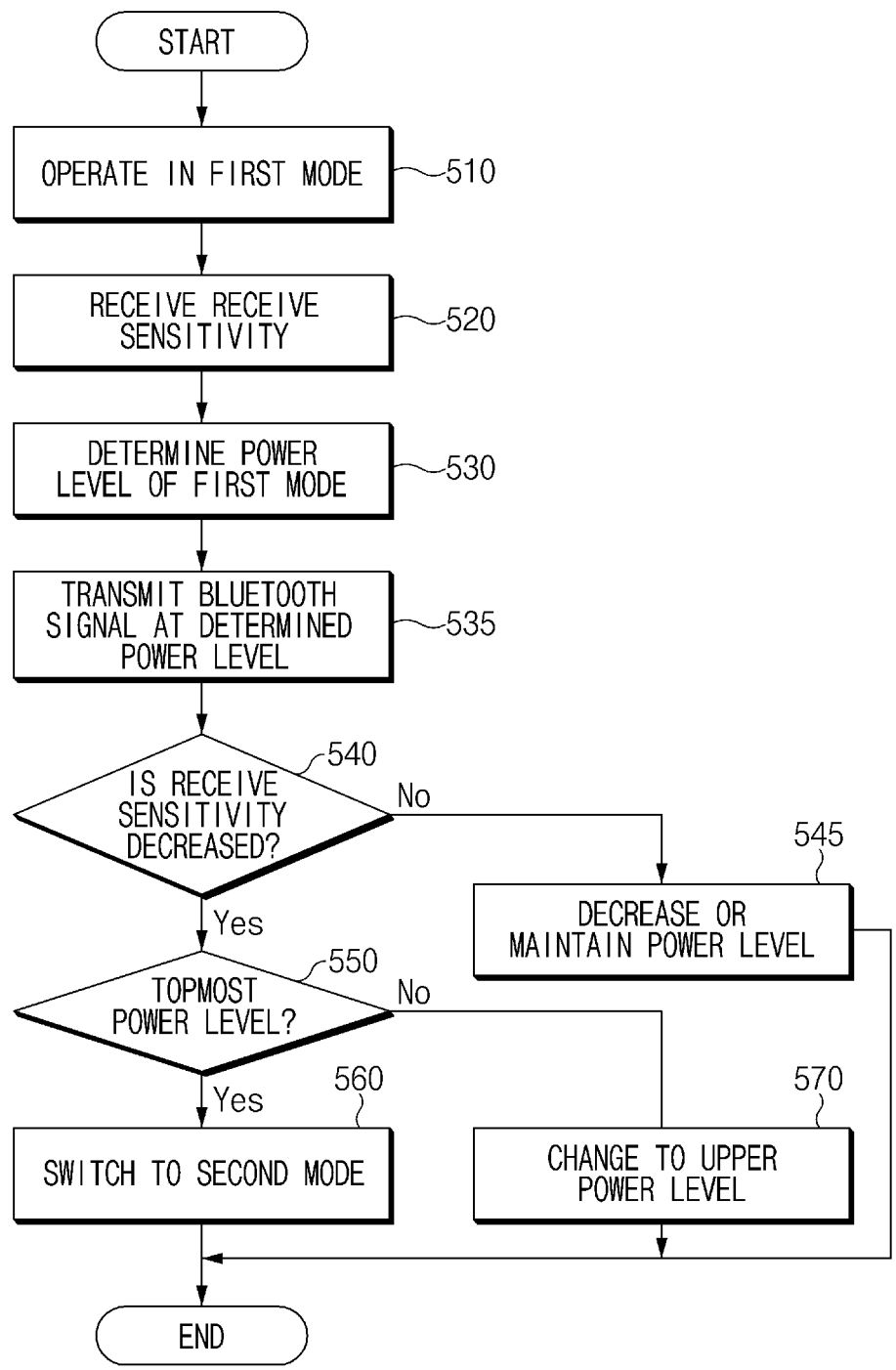
FIG. 5 is a flowchart illustrating a stepwise change from a first mode to a second mode according to certain embodiments.

FIG. 5 is a flowchart illustrating a stepwise change from a first mode to a second mode according to certain embodiments. FIG. 5 is illustrative, but not limited thereto. For example, a power level of the first mode may change to a power level of the second mode irrespective of a stage of the power level of the first mode.

Referring to FIG. 5, when an interference condition of an external signal is a general state, in operation 510, a processor 260 of a first electronic device 101 of FIG. 2 may operate in the first mode. The first mode may be a mode of adjusting a transmission power of Bluetooth communication based on receive sensitivity of a second electronic device 102 of FIG. 1. In the first mode, the processor 260 may operate on the basis of a plurality of power levels. For example, the processor 260 may set first to fourth power levels at which a transmission power is increased on a sequential basis.

In operation 520, the processor 260 may receive receive sensitivity (e.g., an RSSI) of the second electronic device 102 for an audio signal transmitted from the first electronic device 101.

In operation 530, the processor 260 may determine a power level of the first mode corresponding to the receive sensitivity (e.g., the RSSI) of the second electronic device 102.

In operation 535, the processor 260 may transmit a Bluetooth signal using a first transmitting unit 221 of FIG. 2 at the determined power level.

In operation 540, the processor 260 may identify whether the receive sensitivity (e.g., the RSSI) of the second electronic device 102 decreases to a specified value or more.

When the receive sensitivity (e.g., the RSSI) of the second electronic device 102 is decreased or maintained, in operation 545, the processor 260 may reduce or maintain a power level of the first mode.

When the receive sensitivity (e.g., the RSSI) of the second electronic device 102 decreases to the specified value or more, in operation 550, the processor 260 may identify whether a current power level of the first mode is a topmost power level of the first mode. For example, when the first to fourth power levels at which the transmission power is increased on a sequential basis are set, the processor 260 may identify whether the first transmitting unit 221 is operating at the fourth power level.

When the current power level of the first mode is the topmost power level of the first mode, in operation 560, the processor 260 may switch to a second mode. The second mode may be a mode of maintaining a stronger transmission power than the first mode. The processor 260 may transmit a Bluetooth signal using a transmitting unit (e.g., a second transmitting unit 222 of FIG. 2) corresponding to the second mode.

When the current power level of the first mode is not the topmost power level of the first mode, in operation 570, the processor 260 may change to an upper power level on a stage-by-stage basis. For example, when the first transmitting unit 221 is operating at the third power level among the first to fourth power levels at which the transmission power is increased on a sequential basis, the processor 260 may operate the first transmitting unit 221 at the fourth power level.

According to certain embodiments, the processor 260 may identify an interference condition irrespective of a power level in the first mode and may change to the second mode.

For example, when the first to fourth power levels at which the transmission power is increased on a sequential basis are set in the first mode, the processor 260 may operate a Bluetooth module 220 of FIG. 2 at the second power level. When in an interference state meeting the interference condition, the processor 260 may switch to the second mode without changing to the third power level or the fourth power level.

Figure 6:
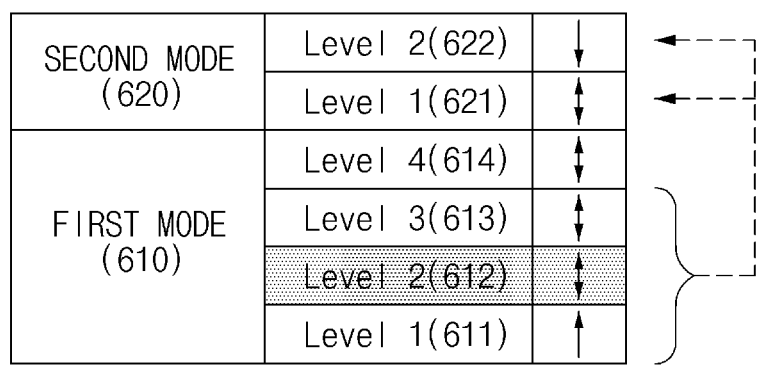
FIG. 6 is a drawing illustrating a change in power level according to certain embodiments.

FIG. 6 is a drawing illustrating a change in power level according to certain embodiments. FIG. 6 is illustrative, but not limited thereto.

Referring to FIG. 6, a processor 260 of FIG. 2 may operate a Bluetooth module 220 of FIG. 2 in a first mode 610 or a second mode 620. The first mode 610 may be a mode of transmitting a Bluetooth signal using a first transmitting unit 221 of the Bluetooth module 220. The second mode 620 may be a mode of transmitting a Bluetooth signal using a second transmitting unit 222 of the Bluetooth module 220. The second mode 620 may be to maintain a higher power level than the first mode 610.

The first mode 610 may include first to fourth power levels 611 to 614 at which a transmission power is increased on a sequential basis. In a general state which does not meet an interference condition, the processor 260 may transmit a Bluetooth signal at one of the first to fourth power levels 611 to 614. In an embodiment, one (e.g., the second power level 612) of the first to fourth power levels 611 to 614 may correspond to a golden range. The golden range may indicate a receive sensitivity range capable of receiving an audio signal without damage of sound quality.

According to certain embodiments, in the first mode 610, the processor 260 may change a power level between the first to fourth power levels 611 to 614, based on receive sensitivity (an RSSI) of a second electronic device 102 of FIG. 1 with respect to an audio signal transmitted from a first electronic device 101 of FIG. 2.

According to certain embodiments, in a state where the processor 260 is operating at the fourth power level 614, when the receive sensitivity (e.g., the RSSI) of the second electronic device 102 decreases to a specified value or less, the processor 260 may switch to a first power level 621 of the second mode 620 irrespective of an interference condition.

According to certain embodiments, in a state where the processor 260 is operating at the first power level 621, when the receive sensitivity (e.g., the RSSI) of the second electronic device 102 increases to the specified value or more, the processor 260 may switch to the fourth power level 614 of the first mode 610 irrespective of the interference condition.

According to an embodiment, in a state where the processor 260 is operating at the first to third power levels 611 to 613, when the interference condition occurs, the processor 260 may change a power level on a sequential basis. For example, when the interference condition occurs while the processor 260 operates in the third power level 613 of the first mode 610, the processor 260 may change to the fourth power level 614. When the interference condition is maintained after a specified time (e.g., 3 seconds) elapses, the processor 260 may change to the first power level 621 of the second mode 620.

According to another embodiment, in a state where the processor 260 is operating at the first to third power levels 611 to 613 of the first mode 610, when the interference condition occurs, the processor 260 may change a power level to the second mode 620. For example, when the interference condition occurs while the processor 260 operates in the third power level 613 of the first mode 610, the processor 260 may change to the first power level 621 of the second mode 620.

According to an embodiment, in the second mode 620, the processor 260 may change a power level between the first power level 621 and the second power levels 622, based on receive sensitivity (e.g., an RSSI) of the second electronic device 102 with respect to an audio signal transmitted from the first electronic device 101.

According to another embodiment, in the second mode 620, the processor 260 may change a power level between the first power level 621 and the second power level 622, based on intensity of the interference condition.

According to an embodiment, in a state where the processor 260 is operating at the first power level 621 or the second power level 622 of the second mode 620, when the interference condition is resolved, the processor 260 may change a power level on a sequential basis. For example, when the interference condition is resolved while the processor 260 operates in the second power level 622 of the second mode 620, the processor 260 may change to the first power level 621. When the interference condition does not occur after the specified time (e.g., 3 seconds) elapses, the processor 260 may change to the fourth power level 614 of the first module 610.

According to another embodiment, in a state where the processor 260 is operating at the first power level 621 or the second power level 622 of the second mode 620, when the interference condition is resolved, the processor 260 may change to a specified power level to the first mode 610. For example, when the interference condition is resolved while the processor 260 operates in the second power level 622 of the second mode 620, the processor 260 may change to the second power level 612 of the first mode 610.

Figure 7:
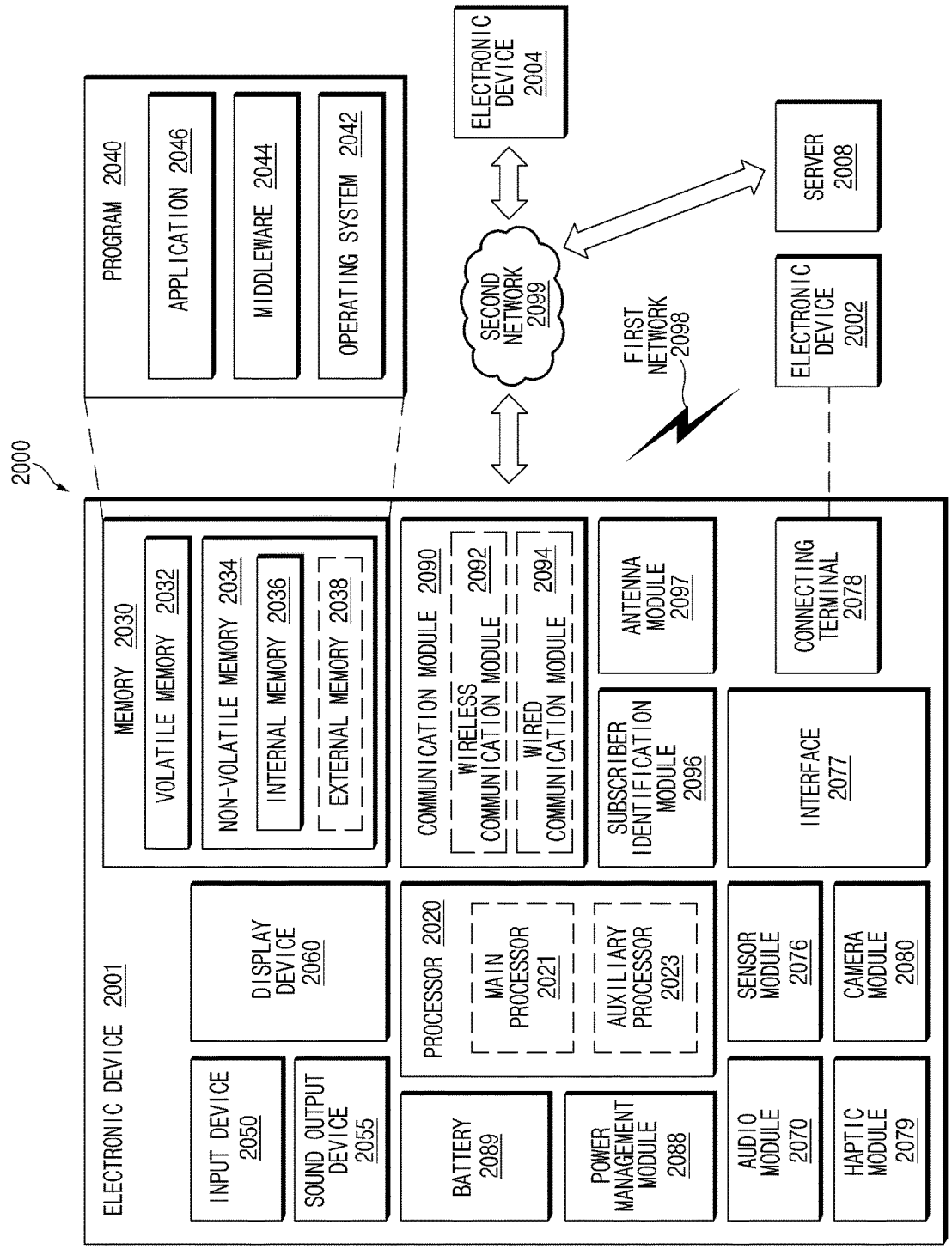
FIG. 7 is a block diagram illustrating an electronic device in a network environment according to certain embodiments.

FIG. 7 illustrates a block diagram of an electronic device 2001 (e.g., the electronic device 101 of FIG. 1) in a network environment 2000, according to certain embodiments. Electronic devices according to certain embodiments disclosed in the disclosure may be various types of devices. An electronic device may include at least one of, for example, a portable communication device (e.g., a smartphone, a computer device (e.g., a PDA: personal digital assistant), a tablet PC, a laptop PC, a desktop PC, a workstation, or a server), a portable multimedia device (e.g., e-book reader or MP3 player), a portable medical device (e.g., heart rate, blood sugar, blood pressure, or body temperature measuring device), a camera, or a wearable device. The wearable device may include at least one of an accessory type device (e.g., watches, rings, bracelets, anklets, necklaces, glasses, contact lenses, or head wearable device head-mounted-device (HMD)), a fabric or clothing integral device (e.g., an electronic clothing), a body-attached device (e.g., skin pads or tattoos), or an bio implantable circuit. In some embodiments, the electronic device may include at least one of, for example, a television, a DVD (digital video disk) player, an audio device, an audio accessory device (e.g., a speaker, headphones, or a headset), a refrigerator, an air conditioner, a cleaner, an oven, a microwave oven, a washing machine, an air purifier, a set top box, a home automation control panel, a security control panel, a game console, an electronic dictionary, an electronic key, a camcorder, or an electronic picture frame.

In another embodiment, the electronic device may include at least one of a navigation device, GNSS (global navigation satellite system), an EDR (event data recorder (e.g., black box for vehicle/ship/airplane), an automotive infotainment device (e.g., vehicle head-up display), an industrial or home robot, a drone, ATM (automated teller machine), a POS (point of sales) instrument, a measurement instrument (e.g., water, electricity, or gas measurement equipment), or an Internet of Things device (e.g. bulb, sprinkler device, fire alarm, temperature regulator, or street light). The electronic device according to the embodiment of the disclosure is not limited to the above-described devices. Further, for example, as in a smart phone equipped with measurement of biometric information (e.g., a heart rate or blood glucose) of an individual, the electronic device may have a combination of functions of a plurality of devices. In the disclosure, the term "user" may refer to a person using the electronic device or a device (e.g., an artificial intelligence electronic device) using the electronic device.

Referring to FIG. 7, the electronic device 2001 in the network environment 2000 may communicate with an electronic device 2002 over a first network 2098 (e.g., a short range wireless communication network) or may communicate with an electronic device 2004 or a server 2008 over a second network 2099 (e.g., a long distance wireless communication network). According to an embodiment, the electronic device 2001 may communicate with the electronic device 2004 through the server 2008. According to an embodiment, the electronic device 2001 may include a processor 2020, a memory 2030, an input device 2050, a sound output device 2055, a display device 2060, an audio module 2070, a sensor module 2076, an interface 2077, a haptic module 2079, a camera module 2080, a power management module 2088, a battery 2089, a communication module 2090, a subscriber identification module 2096, or an antenna module 2097. In any embodiment, at least one (e.g., the display device 2060 or the camera module 2080) of the components may be omitted from the electronic device 2001, or one or more other components may be further included in the electronic device 2001. In any embodiment, some of the components may be implemented with a single integrated circuit. For example, the sensor module 2076 (e.g., a fingerprint sensor, an iris sensor, or an illumination sensor) may be embedded in the display device 2060 (e.g., a display).

The processor 2020 may execute, for example, software (e.g., a program 2040) to control at least one other component (e.g., a hardware or software component) of the electronic device 2001 connected to the processor 2020, and may perform various data processing or operations. According to an embodiment, as at least a part of the data processing or operations, the processor 2020 may load a command or data received from any other component (e.g., the sensor module 2076 or the communication module 2090) to a volatile memory 2032, may process the command or data stored in the volatile memory 2032, and may store processed data in a nonvolatile memory 2034. According to an embodiment, the processor 2020 may include a main processor 2021 (e.g., a central processing unit or an application processor) and an auxiliary processor 2023 (e.g., a graphic processing device, an image signal processor, a sensor hub processor, or a communication processor), which may be operated independently of or together with the main processor 2021. Additionally or alternatively, the auxiliary processor 2023 may be configured to use lower power than the main processor 2021 or to be specialized for a specified function. The auxiliary processor 2023 may be implemented separately from the main processor 2021 or may be implemented as a part of the main processor 2021.

The term "processor" shall be understood to refer to both the singular and the plural contexts.

The auxiliary processor 2023 may control at least a part of a function or states associated with at least one component (e.g., the display device 2060, the sensor module 2076, or the communication module 2090) of the electronic device 2001, for example, instead of the main processor 2021 while the main processor 2021 is in an inactive (e.g., sleep) state and together with the main processor 2021 while the main processor 2021 is in an active (e.g., an application execution) state. According to an embodiment, the auxiliary processor 2023 (e.g., an image signal processor or a communication processor) may be implemented as a part of any other component (e.g., the camera module 2080 or the communication module 2090) which is functionally (or operatively) associated with the auxiliary processor 2023.

The memory 2030 may store various data which are used by at least one component (e.g., the processor 2020 or the sensor module 2076) of the electronic device 2001. The data may include, for example, software (e.g., the program 2040), or input data or output data associated with a command of the software. The memory 2030 may include the volatile memory 2032 or the nonvolatile memory 2034.

The program 2040 may be stored in the memory 2030 as software, and may include, for example, an operating system 2042, a middleware 2044, or an application 2046.

The input device 2050 may receive a commands or data which will be used by a component (e.g., the processor 2020) of the electronic device 2001, from the outside (e.g., a user) of the electronic device 2001. The input device 2050 may include, for example, a microphone, a mouse, or a keyboard.

The sound output device 2055 may output a sound signal to the outside of the electronic device 2001. The sound output device 2055 may include, for example, a speaker or a receiver. The speaker may be used for a general purpose such as multimedia play or recording play, and the receiver may be used to receive an incoming call. According to an embodiment, the receiver may be implemented separately from the speaker or may be implemented as a part of the speaker.

The display device 2060 may visually provide information to the outside (e.g., the user) of the electronic device 2001. The display device 2060 may include, for example, a display, a hologram device, or a control circuit for controlling a projector and a corresponding device. According to an embodiment, the display device 2060 may include a touch circuitry configured to sense a touch, or a sensor circuitry (e.g., a pressure sensor) configured to measure the strength of force generated by the touch.

The audio module 2070 may convert sound to an electrical signal, or reversely, may convert an electrical signal to sound. According to an embodiment, the audio module 2070 may obtain sound through the input device 2050, or may output sound through the sound output device 2055, or through an external electronic device (e.g., the electronic device 2002) (e.g., a speaker or a headphone) directly or wirelessly connected with the electronic device 2001.

The sensor module 2076 may sense an operation state (e.g., power or a temperature) of the electronic device 2001 or an external environment state (e.g., a user state), and may generate an electrical signal or a data value corresponding the sensed state. According to an embodiment, the sensor module 2076 may include, for example, a gesture sensor, a grip sensor, a barometric pressure sensor, a magnetic sensor, an acceleration sensor, a grip sensor, a proximity sensor, a color sensor, an infrared (IR) sensor, a biometric sensor, a temperature sensor, a humidity sensor, or an illumination sensor.

The interface 2077 may support one or more specified protocols that may be used to directly and wirelessly connect the electronic device 2001 with an external electronic device (e.g., the electronic device 2002). According to an embodiment, the interface 2077 may include, for example, a high definition multimedia interface (HDMI), a universal serial bus (USB) interface, a secure digital (SD) card interface, or an audio interface.

A connection terminal 2078 may include a connector that may allow the electronic device 2001 to be physically connected with an external electronic device (e.g., the electronic device 2002). According to an embodiment, the connection terminal 2078 may include, for example, a HDMI connector, a USB connector, a SD card connector, or an audio connector (e.g., a headphone connector).

The haptic module 2079 may convert an electrical signal to a mechanical stimulation (e.g., vibration or movement) or an electrical stimulation which the user may perceive through the sense of touch or the sense of movement. According to an embodiment, the haptic module 2079 may include, for example, a motor, a piezoelectric sensor, or an electrical stimulation device.

The camera module 2080 may photograph a still image and a video. According to an embodiment, the camera module 2080 may include one or more lenses, image sensors, image signal processors, or flashes (or electrical flashes).

The power management module 2088 may manage the power which is supplied to the electronic device 2001. According to an embodiment, the power management module 2088 may be implemented, for example, as at least a part of a power management integrated circuit (PMIC).

The battery 2089 may power at least one component of the electronic device 2001. According to an embodiment, the battery 2089 may include, for example, a primary cell not recharged, a secondary cell rechargeable, or a fuel cell.

The communication module 2090 may establish a direct (or wired) communication channel or a wireless communication channel between the electronic device 2001 and an external electronic device (e.g., the electronic device 2002, the electronic device 2004, or the server 2008) or may perform communication through the established communication channel. The communication module 2090 may include one or more communication processors which is operated independently of the processor 2020 (e.g., an application processor) and supports direct (or wired) communication or wireless communication. According to an embodiment, the communication module 2090 may include a wireless communication module 2092 (e.g., a cellular communication module, a short range wireless communication module, or a global navigation satellite system (GNSS) communication module) or a wired communication module 2094 (e.g., a local area network (LAN) communication module or a power line communication module). A corresponding communication module of such communication modules may communicate with an external electronic device over the first network 2098 (e.g., a short range communication network such as Bluetooth, Wi-Fi direct, or infrared data association (IrDA)) or the second network 2099 (e.g., a long distance communication network such as a cellular network, an Internet, or a computer network (e.g., LAN or WAN)). The above-described kinds of communication modules may be integrated in one component (e.g., a single chip) or may be implemented with a plurality of components (e.g., a plurality of chips) which are independent of each other. The wireless communication module 2092 may verify and authenticate the electronic device 2001 within a communication network, such as the first network 2098 or the second network 2099, by using subscriber information (e.g., international mobile subscriber identity (IMSI)) stored in the subscriber identification module 2096.

The antenna module 2097 may transmit a signal or a power to the outside (e.g., an external electronic device) or may receive a signal or a power from the outside. According to an embodiment, the antenna module 2097 may include one or more antennas, and at least one antenna which is suitable for a communication scheme used in a computer network such as the first network 2098 or the second network 2099 may be selected, for example, by the communication module 2090 from the one or more antennas. The signal or power may be exchanged between the communication module 2090 and an external electronic device through the selected at least one antenna or may be received from the external electronic device through the selected at least one antenna and the communication module 2090.

At least some of the components may be connected to each other through a communication scheme (e.g., a bus, a general purpose input and output (GPIO), a serial peripheral interface (SPI), or a mobile industry processor interface (MIPI)) between peripheral devices and may exchange signals (e.g., commands or data) with each other.

According to an embodiment, a command or data may be transmitted or received (or exchanged) between the electronic device 2001 and the external electronic device 2004 through the server 2008 connecting to the second network 2099. Each of the electronic devices 2002 and 2004 may be a device, the kind of which is the same as or different from a kind of the electronic device 2001. According to an embodiment, all or a part of operations to be executed in the electronic device 2001 may be executed in one or more external devices of the external electronic devices 2002, 2004, or 2008. For example, in the case where the electronic device 2001 should perform any function or service automatically or in response to a request from the user or any other device, the electronic device 2001 may request one or more external electronic devices to perform at least a part of the function or service, instead of internally executing the function or service or additionally. The one or more external electronic devices which receive the request may execute at least a part of the function or service thus requested or an additional function or service associated with the request, and may provide a result of the execution to the electronic device 2001. The electronic device 2001 may process received result as it is or additionally, and may provide a result of the processing as at least a part of the response to the request. To this end, for example, a cloud computing, distributed computing, or client-server computing technology may be used.

An electronic device (e.g., an electronic device 101 of FIG. 1 or an electronic device 2001 of FIG. 7) according to certain embodiments may include a communication circuitry (e.g., a Bluetooth module unit 220 of FIG. 2 or a wireless communication module 2092 of FIG. 7) configured to transmit a first wireless communication signal to an external device (e.g., a second electronic device 102 of FIG. 1 or an electronic device 2002 of FIG. 7) in a first communication scheme, a memory (e.g., a memory 230 of FIG. 2 or a memory 2030 of FIG. 7), and a processor (e.g., a processor 260 of FIG. 2 or a processor 2020 of FIG. 7). The processor (e.g., the processor 260 of FIG. 2 or the processor 2020 of FIG. 7) may scan a second wireless communication signal by a second communication scheme around the electronic device (e.g., the first electronic device 101 of FIG. 1 or the electronic device 2001 of FIG. 7), may operate in a first mode of controlling a transmission power of the first wireless communication signal based on receive sensitivity for the first wireless communication signal of the external device (e.g., the second electronic device 102 of FIG. 1 or the electronic device 2002 of FIG. 7), when the second wireless communication signal is determined as a first state where interference for the first communication scheme does not occur, and may operate in a second mode of transmitting the first wireless communication signal at a higher transmission power than the first mode, when the second wireless communication signal is determined as a second state where interference for the first communication scheme occurs.

According to an embodiment, the processor (e.g., the processor 260 of FIG. 2 or the processor 2020 of FIG. 7) may scan the second wireless communication signal at a specified time period.

According to an embodiment, the processor (e.g., the processor 260 of FIG. 2 or the processor 2020 of FIG. 7) may scan the second wireless communication signal, after proceeding with pairing with the external device (e.g., the second electronic device 102 of FIG. 1 or the electronic device 2002 of FIG. 7). The processor (e.g., the processor 260 of FIG. 2 or the processor 2020 of FIG. 7) may scan the second wireless communication signal at a first period before the pairing and may scan the second wireless communication signal at a second period after the pairing.

According to an embodiment, the processor (e.g., the processor 260 of FIG. 2 or the processor 2020 of FIG. 7) may scan the second wireless communication signal at a first period, when the electronic device (e.g., the first electronic device 101 of FIG. 1 or the electronic device 2001 of FIG. 7) is located in a first area, and may scan the second wireless communication signal at a second period, when the electronic device (e.g., the first electronic device 101 of FIG. 1 or the electronic device 2001 of FIG. 7) is located in a second area.

According to certain embodiments, the processor (e.g., the processor 260 of FIG. 2 or the processor 2020 of FIG. 7) may determine the first state or the second state based on at least one of the number of network devices, each of which processes the second wireless communication signal around the electronic device (e.g., the first electronic device 101 of FIG. 1 or the electronic device 2001 of FIG. 7), a share for each channel of the network device, or intensity of the second wireless communication signal.

According to certain embodiments, the processor (e.g., the processor 260 of FIG. 2 or the processor 2020 of FIG. 7) may maintain the transmission power, when the receive sensitivity is within a specified range in the first mode. The processor (e.g., the processor 260 of FIG. 2 or the processor 2020 of FIG. 7) may change the transmission power, when the receive sensitivity is out of the range in the first mode.

According to certain embodiments, the processor (e.g., the processor 260 of FIG. 2 or the processor 2020 of FIG. 7) may transmit the first wireless communication signal on the basis of a plurality of power levels at which the transmission power is strong on a sequential basis in the first mode.

According to an embodiment, the processor (e.g., the processor 260 of FIG. 2 or the processor 2020 of FIG. 7) may change to the second mode, when the second wireless communication signal is determined as the second state in a state where the first wireless communication signal is transmitted at one of the plurality of power levels.

According to another embodiment, the processor (e.g., the processor 260 of FIG. 2 or the processor 2020 of FIG. 7) may change the power level on a stage-by-stage basis and change to the second mode, when the second wireless communication signal is determined as the second state in a state where the first wireless communication signal is transmitted at one of the plurality of power levels.

According to certain embodiments, the processor (e.g., the processor 260 of FIG. 2 or the processor 2020 of FIG. 7) may transmit the first wireless communication signal on the basis of a plurality of power levels at which the transmission power is strong on a sequential basis in the second mode.

According to an embodiment, the processor (e.g., the processor 260 of FIG. 2 or the processor 2020 of FIG. 7) may change to the first mode, when the second wireless communication signal is determined as the first state in a state where the first wireless communication signal is transmitted at one of the plurality of power levels.

According to another embodiment, the processor (e.g., the processor 260 of FIG. 2 or the processor 2020 of FIG. 7) may change the power level on a stage-by-stage basis and change to the first mode, when the second wireless communication signal is determined as the first state in a state where the first wireless communication signal is transmitted at one of the plurality of power levels.

According to certain embodiments, the communication circuitry (e.g., the Bluetooth module unit 220 of FIG. 2 or the wireless communication module 2092 of FIG. 7) may include a receive circuit (e.g., a receiving unit 223 of FIG. 2) configured to receive data from the external device, a first transmit circuit (e.g., a first transmitting unit 221 of FIG. 2) configured to transmit the first wireless communication signal in the first mode, and a second transmit circuit (e.g., a second transmitting unit 222 of FIG. 2) configured to transmit the first wireless communication signal in the second mode.

According to certain embodiments, the processor (e.g., the processor 260 of FIG. 2 or the processor 2020 of FIG. 7) may scan the second wireless communication signal and may determine the first state or the second state, when a specified application is running. The specified application may be a music play application or a call application, and the first wireless communication signal may be a sound signal.

According to certain embodiments, a wireless communication method performed in an electronic device (e.g., a first electronic device 101 of FIG. 1 or an electronic device 2001 of FIG. 7) may include pairing with an external device (e.g., a second electronic device 102 of FIG. 1 or an electronic device 2002 of FIG. 7) to transmit and receive data in a first communication scheme, scanning a signal by a second communication scheme around the electronic device (e.g., the first electronic device 101 of FIG. 1 or the electronic device 2001 of FIG. 7), performing control in a first mode of changing a transmission power of a first wireless communication signal based on receive sensitivity for the first wireless communication signal of the external device (e.g., the second electronic device 102 of FIG. 1 or the electronic device 2002 of FIG. 7), when a second wireless communication signal is determined as a first state where interference for the first communication scheme does not occur, and performing control in a second mode of transmitting the first wireless communication signal at a higher transmission power than the first mode, when the second wireless communication signal is determined as a second state where the interference for the first communication scheme occurs.

According to certain embodiments, the performing of the control in the first mode may include transmitting the first wireless communication signal on the basis of a plurality of power levels at which the transmission power is strong on a sequential basis in the first mode.

According to certain embodiments, the performing of the control in the first mode may include changing to the second mode, when the second wireless communication signal is determined as the second state in a state where the first wireless communication signal is transmitted at one of the plurality of power levels.

The electronic device according to certain embodiments disclosed in the disclosure may be various types of devices. The electronic device may include, for example, a portable communication device (e.g., a smartphone), a computer device, a portable multimedia device, a mobile medical appliance, a camera, a wearable device, or a home appliance. The electronic device according to an embodiment of the disclosure should not be limited to the above-mentioned devices.

It should be understood that certain embodiments of the disclosure and terms used in the embodiments do not intend to limit technical features disclosed in the disclosure to the particular embodiment disclosed herein; rather, the disclosure should be construed to cover various modifications, equivalents, or alternatives of embodiments of the disclosure. With regard to description of drawings, similar or related components may be assigned with similar reference numerals. As used herein, singular forms of noun corresponding to an item may include one or more items unless the context clearly indicates otherwise. In the disclosure disclosed herein, each of the expressions "A or B", "at least one of A and B", "at least one of A or B", "A, B, or C", "one or more of A, B, and C", or "one or more of A, B, or C", and the like used herein may include any and all combinations of one or more of the associated listed items. The expressions, such as "a first", "a second", "the first", or "the second", may be used merely for the purpose of distinguishing a component from the other components, but do not limit the corresponding components in other aspect (e.g., the importance or the order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

The term "module" used in the disclosure may include a unit implemented in hardware, software, or firmware and may be interchangeably used with the terms "logic", "logical block", "part" and "circuit". The "module" may be a minimum unit of an integrated part or may be a part thereof. The "module" may be a minimum unit for performing one or more functions or a part thereof. For example, according to an embodiment, the "module" may include an application-specific integrated circuit (ASIC).

Certain embodiments of the disclosure may be implemented by software (e.g., the program 2340) including an instruction stored in a machine-readable storage medium (e.g., an internal memory 2336 or an external memory 2338) readable by a machine (e.g., the electronic device 2301). For example, the processor (e.g., the processor 2320) of a machine (e.g., the electronic device 2301) may call the instruction from the machine-readable storage medium and execute the instructions thus called. This means that the machine may perform at least one function based on the called at least one instruction. The one or more instructions may include a code generated by a compiler or executable by an interpreter. The machine-readable storage medium may be provided in the form of non-transitory storage medium. Here, the term "non-transitory", as used herein, means that the storage medium is tangible, but does not include a signal (e.g., an electromagnetic wave). The term "non-transitory" does not differentiate a case where the data is permanently stored in the storage medium from a case where the data is temporally stored in the storage medium.

According to an embodiment, the method according to certain embodiments disclosed in the disclosure may be provided as a part of a computer program product. The computer program product may be traded between a seller and a buyer as a product. The computer program product may be distributed in the form of machine-readable storage medium (e.g., a compact disc read only memory (CD-ROM)) or may be directly distributed (e.g., download or upload) online through an application store (e.g., a Play Store™) or between two user devices (e.g., the smartphones). In the case of online distribution, at least a portion of the computer program product may be temporarily stored or generated in a machine-readable storage medium such as a memory of a manufacturer's server, an application store's server, or a relay server.

According to certain embodiments, each component (e.g., the module or the program) of the above-described components may include one or plural entities. According to certain embodiments, at least one or more components of the above components or operations may be omitted, or one or more components or operations may be added. Alternatively or additionally, some components (e.g., the module or the program) may be integrated in one component. In this case, the integrated component may perform the same or similar functions performed by each corresponding components prior to the integration. According to certain embodiments, operations performed by a module, a programming, or other components may be executed sequentially, in parallel, repeatedly, or in a heuristic method, or at least some operations may be executed in different sequences, omitted, or other operations may be added.

The electronic device according to certain embodiments disclosed in the disclosure may detect an interference signal around the electronic device and may change a wireless communication power of short-range communication to perform Bluetooth communication.

The electronic device according to certain embodiments disclosed in the disclosure may operate in a general mode to control a wireless communication power of Bluetooth communication on a stage-by-stage basis in response to a request signal transmitted from an acoustic output device (e.g., earbuds), when not in an interference condition by a WiFi signal.

The electronic device according to certain embodiments disclosed in the disclosure may operate in a high power mode to maintain a strong output state irrespective of a required power of an acoustic output device (earbuds), when in an interference condition by a WiFi signal.

While the disclosure has been shown and described with reference to certain embodiments thereof, it will be understood by those skilled in the art that various changes in form and details may be made therein without departing from the spirit and scope of the disclosure as defined by the appended claims and their equivalents.

What is claimed is:

1. An electronic device, comprising:
   a communication circuitry configured to transmit or receive a first wireless communication signal to an external device in a first communication scheme;
   a memory; and
   a processor,
   wherein the processor is configured to:
   determine a location of the electronic device;

when the electronic device is located in a first area, scan for a second wireless communication signal by a second communication scheme at a first period, and determine whether the second wireless communication signal interferes in excess of an interference level with the first communication scheme based on at least one of a number of network devices in the first area and a number of sharers for each channel of a network device in the first area;

when the electronic device is located in a second area, scan for the second wireless communication signal at a second period, and determine whether the second wireless communication signal interferes in excess of the interference level with the first communication scheme based on at least one of a number of network devices in the second area and a number of sharers for each channel of a network device in the second area;

operate in a first mode of controlling a transmission power of the first wireless communication signal based on receive sensitivity for the first wireless communication signal of the external device, when the second wireless communication signal is determined to interfere less than the interference level with the first communication scheme; and operate in a second mode of transmitting the first wireless communication signal at a higher transmission power than the first mode, when the second wireless communication signal is determined to interfere in excess of the interference level with the first communication scheme.

2. The electronic device of claim 1, wherein the processor scans for the second wireless communication signal, after pairing with the external device.

3. The electronic device of claim 2, wherein the processor scans for the second wireless communication signal at a third period before the pairing and scans the second wireless communication signal at a fourth period after the pairing.

4. The electronic device of claim 1, wherein the processor maintains the transmission power, when the receive sensitivity is within a specified range in the first mode.

5. The electronic device of claim 4, wherein the processor changes the transmission power, when the receive sensitivity is out of the specified range in the first mode.

6. The electronic device of claim 1, wherein the processor transmits the first wireless communication signal on the basis of a plurality of power levels at which the transmission power is strong on a sequential basis in the first mode.

7. The electronic device of claim 6, wherein the processor changes to the second mode, when the second wireless communication signal is determined to interfere in excess of the interference level in a state where the first wireless communication signal is transmitted at one of the plurality of power levels.

8. The electronic device of claim 6, wherein the processor changes the power level on a stage-by-stage basis and changes to the second mode, when the second wireless communication signal is determined to interfere in excess of the interference level in a state where the first wireless communication signal is transmitted at one of the plurality of power levels.

9. The electronic device of claim 1, wherein the processor transmits the first wireless communication signal on the basis of a plurality of power levels at which the transmission power is strong on a sequential basis in the second mode.

10. The electronic device of claim 9, wherein the processor changes to the first mode, when the second wireless communication signal is determined to interfere less than the interference level in a state where the first wireless communication signal is transmitted at one of the plurality of power levels.

11. The electronic device of claim 9, wherein the processor changes power level on a sequential basis and changes to the first mode, when the second wireless communication signal is determined to interfere less than the interference level in a state where the first wireless communication signal is transmitted at one of the plurality of power levels.

12. The electronic device of claim 1, wherein the communication circuitry includes:
    a receive circuit configured to receive data from the external device;
    a first transmit circuit configured to transmit the first wireless communication signal in the first mode; and
    a second transmit circuit configured to transmit the first wireless communication signal in the second mode.

13. The electronic device of claim 1, wherein the processor scans for the second wireless communication signal and determines the second wireless communication signal interferes less than or in excess of the interference level, when a specified application is running.

14. The electronic device of claim 13, wherein the specified application a music play application or a call application, and
    wherein the first wireless communication signal is an audio signal.

15. A wireless communication method performed in an electronic device, the wireless communication method comprising:
    pairing with an external device to transmit and receive data in a first communication scheme;
    determining a location of the electronic device;
    when the electronic device is located in a first area, scanning for a second wireless communication signal by a second communication scheme at a first period, and determining whether the second wireless communication signal interferes in excess of an interference level with the first communication scheme based on at least one of a number of network devices in the first area and a number of sharers for each channel of a network device in the first area;
    when the electronic device is located in a second area, scanning for the second wireless communication signal at a second period, and determining whether the second wireless communication signal interferes in excess of the interference level with the first communication scheme based on at least one of a number of network devices in the second area and a number of sharers for each channel of a network device in the second area;
    performing control in a first mode of changing a transmission power of a first wireless communication signal based on receive sensitivity for the first wireless communication signal of the external device, when the second wireless communication signal is determined to interfere by less than an interference level with the first communication scheme; and
    performing control in a second mode of transmitting the first wireless communication signal at a higher transmission power than the first mode, when the second wireless communication signal is determined to interfere in excess of the interference level with the first communication scheme.

16. The wireless communication method of claim 15, wherein the performing of the control in the first mode includes:

transmitting the first wireless communication signal on the basis of a plurality of power levels at which the transmission power is strong on a sequential basis in the first mode.

17. The wireless communication method of claim 16, wherein the performing of the control in the first mode includes:

changing to the second mode, when the second wireless communication signal is determined to interfere in excess of the interference level with the first communication scheme in a state where the first wireless communication signal is transmitted at one of the plurality of power levels.

* * * * *